May 21, 1929.  W. A. GEIGER  1,713,960
FRICTION SHOCK ABSORBING MECHANISM
Filed April 22, 1927
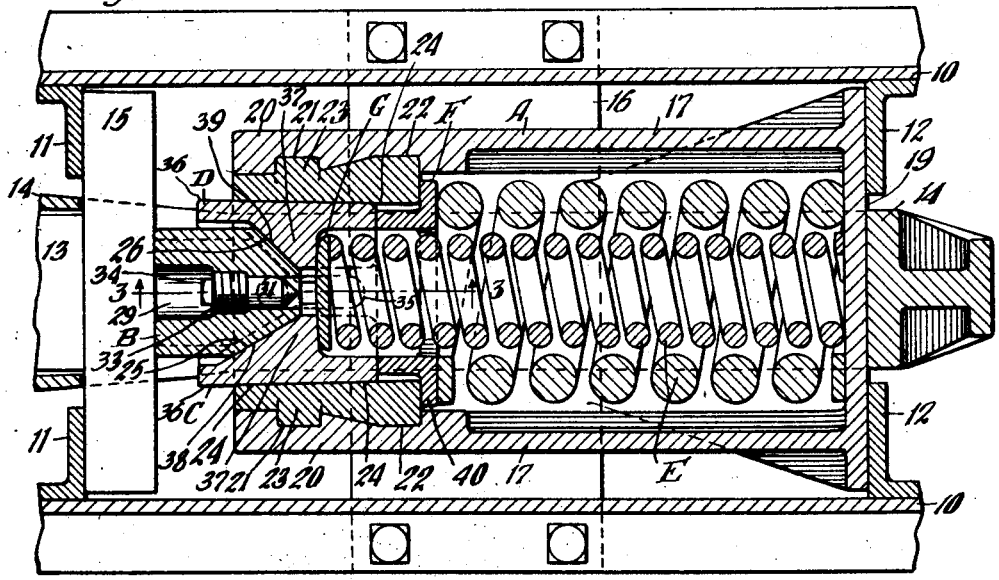
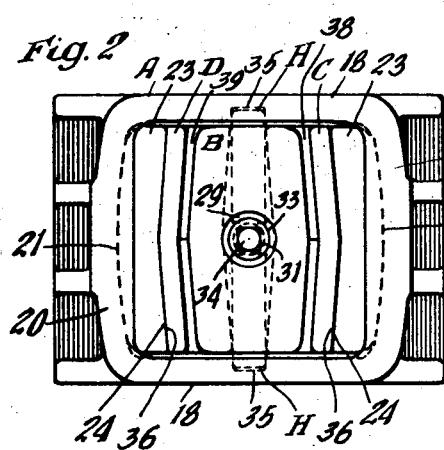
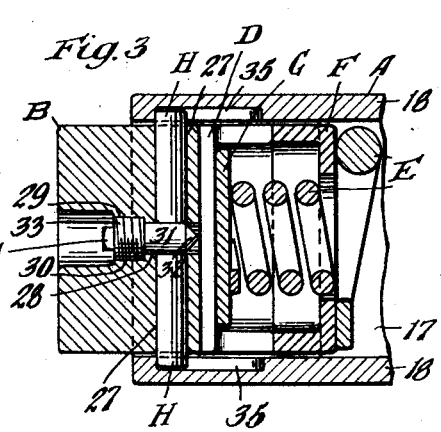
Inventor
William A. Geiger
By George I Haight
His Atty.
Witness
Hans M. Rachlitz Patented May 21, 1929.

1,713,960

UNITED STATES PATENT OFFICE.

WILLIAM A. GEIGER, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed April 22, 1927. Serial No. 185,736.

This invention relates to improvements in friction shock absorbing mechanisms.

One object of the invention is to provide a friction shock absorbing mechanism especially adapted for railway draft riggings, including a column element having friction surfaces thereon, and spring resisted friction means co-operating with the column element, including a combined pressure transmitting spreading element, wherein simple and efficient readily applied means is provided for anchoring the combined pressure transmitting and spreading element to the column element, thereby limiting outward movement of the former and maintaining the parts of the mechanism assembled.

In the drawings, forming a part of this specification, Figure 1 is a horizontal longitudinal sectional view of a portion of a railway draft rigging showing my improvements in connection therewith. Figure 2 is a front end elevational view of the shock absorbing mechanism proper and Figure 3 is a longitudinal vertical sectional view of the front end portion of the shock absorbing mechanism corresponding substantially to the line 3—3 of Figure 1. In said drawings, 10—10 indicate channel-shaped center or draft sills of a railway draft rigging, having the usual front stop plugs 11—11 and the usual rear stop lugs 12—12 secured to the inner sides thereof. The inner end of the drawbar is designated by 13 to which is operatively connected a yoke 14. The shock absorbing mechanism proper and a front main follower 15 are disposed within the yoke. The yoke and the parts therewithin are supported in operative position by a detachable saddle plate 16 fixed to the draft sills.

My improved shock absorbing mechanism proper comprises broadly: A combined friction shell and spring cage A; a wedge block B; two friction shoes C and D; a main spring resistance E; a spring follower F; an auxiliary spring follower G; and a pair of retaining pins H—H.

The combined spring cage and friction shell is in the form of a substantially rectangular casting having longitudinally disposed vertical spaced side walls 17—17, horizontally disposed longitudinally extending spaced top and bottom walls 18—18 and a transverse rear end wall 19. The end wall 19, as most clearly shown in Figures 1 and 2, is extended laterally beyond the side walls 17 and co-operates with the stop lugs 12 in the manner of the usual rear follower. The casting A is preferably reinforced by longitudinally extending ribs which are formed integral with the side walls 17 and the end wall 19. At the forward end of the combined spring cage and friction shell A, the side walls are thickened as indicated at 20 and the thickened portions 20 are grooved as indicated at 21 and 22 to receive ribs or extensions on liners 23, thereby anchoring the liners to the cage A. The liners 23, as shown, are two in number and present longitudinally disposed interior V-shaped friction surfaces 24 on the inner sides thereof. The friction surfaces 24 are preferably converged inwardly of the mechanism as most clearly shown in Figure 1. The liners 23, together with the top and bottom walls 18 at the forward end of the spring cage A, define the friction shell section of the same. As clearly shown in Figures 1 and 2, the liners 23 have curved bearing faces engaging the walls of the cage A and protrude inwardly beyond said side walls, thereby presenting transverse abutment faces at the rear ends thereof adapted to co-operate with the spring follower F to limit outward movement of the same.

The wedge block B has a flat front end face bearing directly on the inner side of the main follower 15. At the inner end, the wedge block B is provided with a pair of inwardly converging V-shaped wedge faces 25 and 26 on the opposite sides thereof, the wedge face 25 being preferably disposed at a relatively keen wedge acting angle with respect to the longitudinal axis of the mechanism and the wedge face 26 being preferably disposed at a relatively blunt releasing angle with respect to said axis. The wedge block B is provided with a vertical bore 27 adjacent the inner end thereof adapted to receive the retaining pins H—H. The block B is also provided with a longitudinal central bore 28 intersecting the vertical bore 27. The bore 28 is enlarged at its outer end as indicated at 29 and opens through the front end of the wedge block B. At the juncture of the bore 28 with the enlarged portion 29, the same is threaded as indicated at 30. A plug 31 is disposed within the inner end of the bore 28 to maintain the retaining pins H separated with their outer ends projecting as most clearly shown in Figure 3. The plug 31 has a conical inner end 32 and a threaded head 33 co-operating with the threaded portion 30 of the bore 28. At the outer end, the plug is provided with a square wrench receiving boss 34 by which the same may be screwed into the threaded portion of the opening 28. It will be evident that when the plug 31 is inserted within the wedge, the conical end 32 thereof engages the inner ends of the pins H, thereby spreading the same apart and projecting the outer ends beyond the top and bottom faces of the wedge block B. When the plug 31 is fully inserted as shown in Figure 3, the shank portion thereof maintains the pins projected. The top and bottom ends of the pins H work in longitudinal slots 35 provided in the top and bottom walls of the spring cage A. The slots 35 as shown in Figure 3 terminate short of the outer end of the cage A, thereby presenting shoulders co-operating with the projecting portions of the pins H to limit outward movement of the wedge B and maintain the same assembled with the cage A.

The friction shoes C and D are interposed between the wedge block B and the liners 23. The shoes C and D are of similar design except as hereinafter pointed out. Each of the shoes is provided with a longitudinally disposed outer V-shaped friction surface 36 adapted to engage the friction surfaces 24 of the corresponding liner 23. On the inner side, each shoe is provided with a lateral enlargement 37 having a V-shaped wedge face on the front side thereof. The wedge face of the shoe C is designated by 38 and co-operates with the wedge face 25 of the block B and is correspondingly inclined thereto and the wedge face of the shoe D is designated by 39 and co-operates with the wedge face 26 of the block B and is correspondingly inclined thereto.

The spring resistance E which is disposed within the spring cage A comprises a relatively light inner coil and a heavier outer coil. The outer coil of the spring resistance has the front end thereof bearing on the spring follower F. The spring follower F is the form of a flanged ring having the laterally projecting flange section 40 thereof engaging behind the liners 23, thereby limiting outward movement of the spring follower. The central coil of the spring E extends through the ring like spring follower F and has the forward end thereof bearing on the auxiliary spring follower G, which is in the form of a disk interposed between said spring and the inner ends of the enlargements on the friction shoes C and D. The parts are so proportioned that when the mechanism is assembled, the spring resistance E is preferably under initial compression. Inasmuch as the inner coil of the spring resistance which as heretofore stated, is under initial compression, directly co-operates with the friction shoes, the same tends to force the shoes outwardly, thereby compensating for wear of the various friction and wedge faces of the mechanism.

In assembling the mechanism, the spring resistance element E, the liners 23, the spring follower F and the auxiliary spring follower G are inserted within the combined spring cage and friction shell. The wedge block, with the pins H disposed within the bore 27, is then inserted within the front end of the combined spring cage and friction shell, with the outer ends of the pins being disposed inwardly of or in alignment with the top and bottom faces of the wedge block so as to clear the top and bottom walls of the cage A. When the wedge block has been inserted, the proper distance, so that the ends of the pins H will engage within the slots 35 of the top and bottom walls of the cage A, when projected, the plug 31 is inserted through the front end of the wedge and screwed home. Due to the taper of the inner end of the plug as hereinbefore pointed out, the pins H will be forced apart and when the plug has been screwed home, the shank of the plug will maintain the pins in the projected position shown in Figure 3.

Although I have herein shown a screw threaded plug for holding the pins projected, it will be evident that a plug may be employed which has a driving fit with the wedge block. It will also be evident that any other suitable means may be employed for holding the plug in position within the wedge.

The operation of my improved shock absorbing mechanism, assuming a compression stroke, is as follows: The main follower 15 and the combined spring cage and friction shell A will be moved relatively toward each other, thereby forcing the wedge block inwardly of the cage and placing the shoes under lateral pressure while carrying the same inwardly on the friction surfaces of the liners. The described action will continue either until the actuating force is reduced or the follower 15 engages the outer end of the combined spring cage and friction shell, whereupon the actuating force will be transmitted directly through the cage, the latter acting as a solid column load transmitting member, preventing the springs from being unduly compressed. In release, when the actuating force is reduced, the expansive action of the main spring resistance E will return all of the parts to normal position, outward movement of the wedge block B being limited by the pins H engaging the front end walls of the slots 35 of the cage A. Inasmuch as the block B is in wedging engagement with the friction shoes, the outward movement of the shoes will be limited while movement of the wedge block is arrested.

While I have herein shown and described what I now consider the preferred manner of carrying out my invention, the same is merely illustrative, and I contemplate all changes and modifications that come within the scope of the claims appended thereto.

I claim:

1. In a friction shock absorbing mechanism, the combination with a combined spring cage and friction shell, said shell having a stop shoulder thereon; of friction shoes co-operating with the friction shell; a wedge block within the shell; means for anchoring the wedge block to the shell including a retaining element projecting from the wedge block in the path of the stop shoulder of the shell to limit outward movement of the wdege block and hold the parts assembled, said retaining element being displaceable to house the same entirely within the wedge block when the block is being assembled with the shell, and being movable to projected position after the wedge has been inserted within the shell; means for holding said element projected; and spring means within the cage opposing movement of the shoes inwardly.

2. In a friction shock absorbing mechanism, the combination with a friction shell, said shell having stop shoulders thereon; of friction shoes co-operating with the shell; a wedge block engaging the shoes; a pair of displaceable retaining pins mounted on the wedge, said pins being movable to project the outer end portions thereof beyond the wedge; means carried by the wedge, interposed between the inner ends of the pins for holding said pins projected outwardly of the wedge in the path of said shoulders to maintain the wedge assembled with the shell; and spring means within the shell opposing movement of the shoes.

3. In a friction shock absorbing mechanism, the combination with a rectangular friction shell having interior friction surfaces on two opposite walls thereof, the remaining walls of the shell being provided with slots; of a pair of friction shoes co-operating with the shell friction surfaces; a pressure transmitting block having wedging engagement with the shoes; transversely disposed retainer pins mounted in said block; a plug engaging between the inner ends of said pins for holding the same projected beyond the opposite sides of the block with the outer ends thereof in the slots of the shell to anchor the wedge to the shell; said plug having a tapered point, whereby when the plug is forced into the wedge between the pins, the pins are projected outwardly into said slots; and spring means within the shell resisting inward movement of the shoes.

In witness that I claim the foregoing I have hereunto subscribed my name this 18th day of April, 1927.

WILLIAM A. GEIGER.